F. STAMM.
Cultivator.
No. { 749, 31,753. }
Patented Mar. 19, 1861.
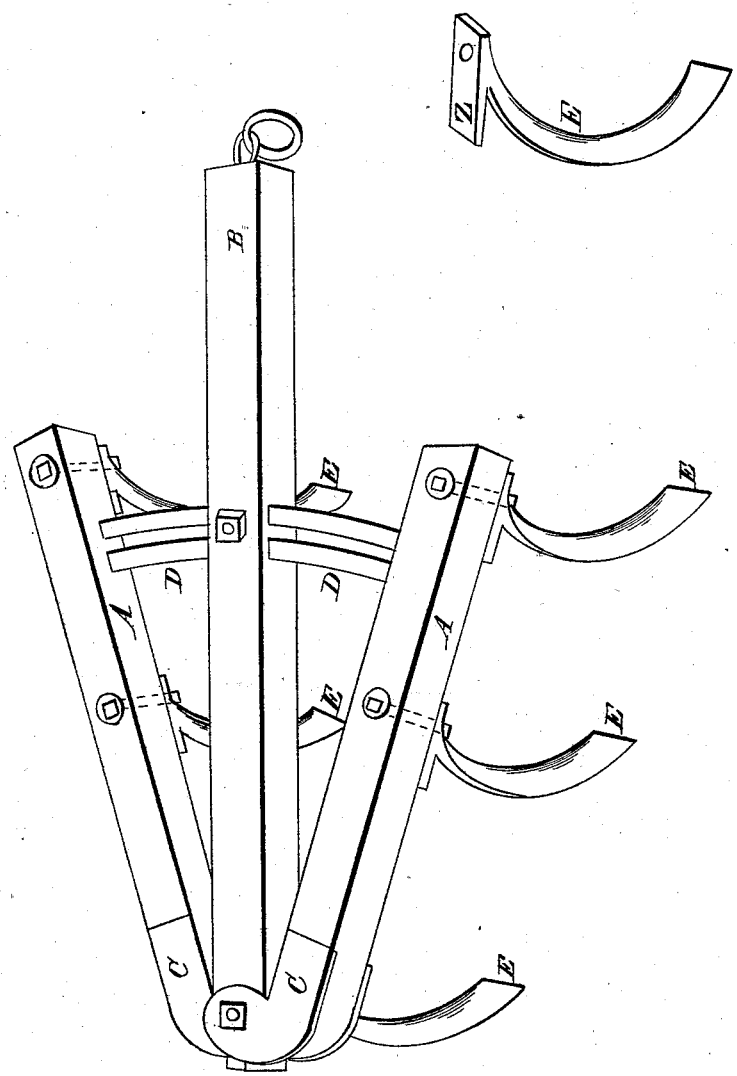
Witnesses.
Inventor.

UNITED STATES PATENT OFFICE.

FREDERICK STAMM, OF LANCASTER, PENNSYLVANIA.

IMPROVEMENT IN CULTIVATORS.

Specification forming part of Letters Patent No. 31,753, dated March 19, 1861.

*To all whom it may concern:*

Be it known that I, FREDERICK STAMM, of Lancaster city, State of Pennsylvania, have invented a new and useful Combined Horse and Hand Harrow and Cultivator; and I do hereby declare that the following is a full and exact description thereof, reference being had to the accompanying drawings, and to the letters of reference marked thereon, making a part of this specification. The nature of my invention consists in the arrangement hereinafter described.

To enable others skilled in the art to make and use my invention, I will proceed to describe its construction and operation.

A represents the side beams, which are adjustable angular shaped, the wide part in front, instead of behind, as usual. The beams are joined together behind, and connected to the draft-beam B by a hinge, C. The beams A are widened or contracted by means of the hinge C and adjusted by the arc-shaped stays D. These stays D are placed aside of each other, and an L-shaped bolt projects through the draft-beam B and between the stays D.

E represents the shovels, which are made of iron with steel edges. They are from twelve to fourteen inches in length, and are made of flat bar-iron about three-fourths of an inch thick and two inches in width, bent in a curve from the beam to the edge, giving them an arc shape with edge to the front, the edge or steel point being forged out something wider than above. The top Z of the shovel is flat and square, so as to fit against the lower part of the beam A, and is secured to this beam by a round bolt, so as to be easily adjusted to be kept square with the draft-beam B. The whole shovel is made of one piece, and curves back from the beam to prevent grass or weeds from dragging up against the beam A. The advantage of having these shovels this shape, and their position with the beams A, is that, first, it prevents choking; secondly, as the first shovel makes its furrow the second or middle shovel throws the ground over toward the furrow, and the last or single shovel covers the furrow on each side, causing the dirt to be worked continually from the center between the rows of corn or other crops up to the row, which does the whole work at once, when, as heretofore, the ground had to be harrowed first, and then the shovel-plow or cultivator had to be used to throw up the loam or dirt to the rows or crop, but by my invention saving much time and labor and the expense and use of two different machines, doing the work of both implements in a very superior manner. Again, the simplicity of the shovels allows them to be easier and much quicker made than those now in use, which also reduces the price of manufacturing them.

What I claim as my invention, and desire to secure by Letters Patent, is—

The arrangement of the draft-beam B, side beams, A, stays D, hinge C, and curved shovel E, with its head Z, the whole being constructed, operated, and operating in the manner and for the purpose herein set forth.

F. STAMM.

Witnesses:
   J. FRANKLIN REIGART,
   J. M. GAINTUER.